Jan. 7, 1964  R. H. MUSE  3,116,949
BOAT TRAILERS AND SHELTERS
Filed Aug. 4, 1961  4 Sheets-Sheet 1
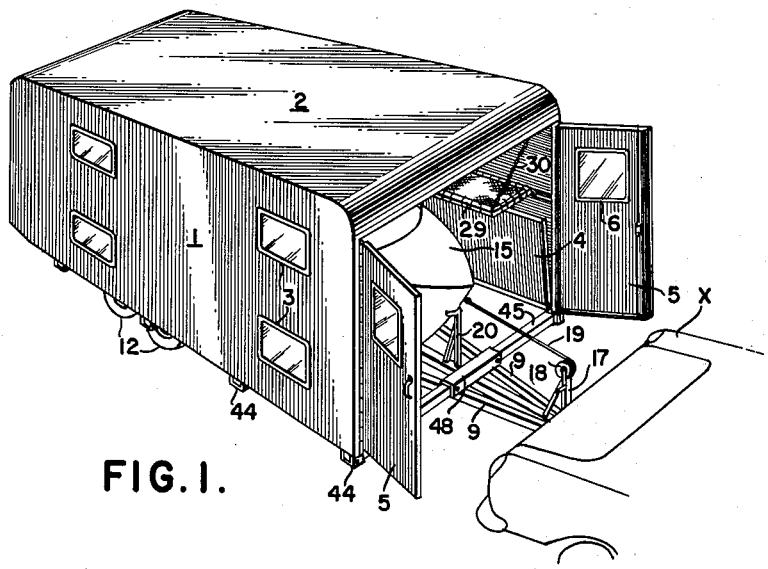
FIG. I.
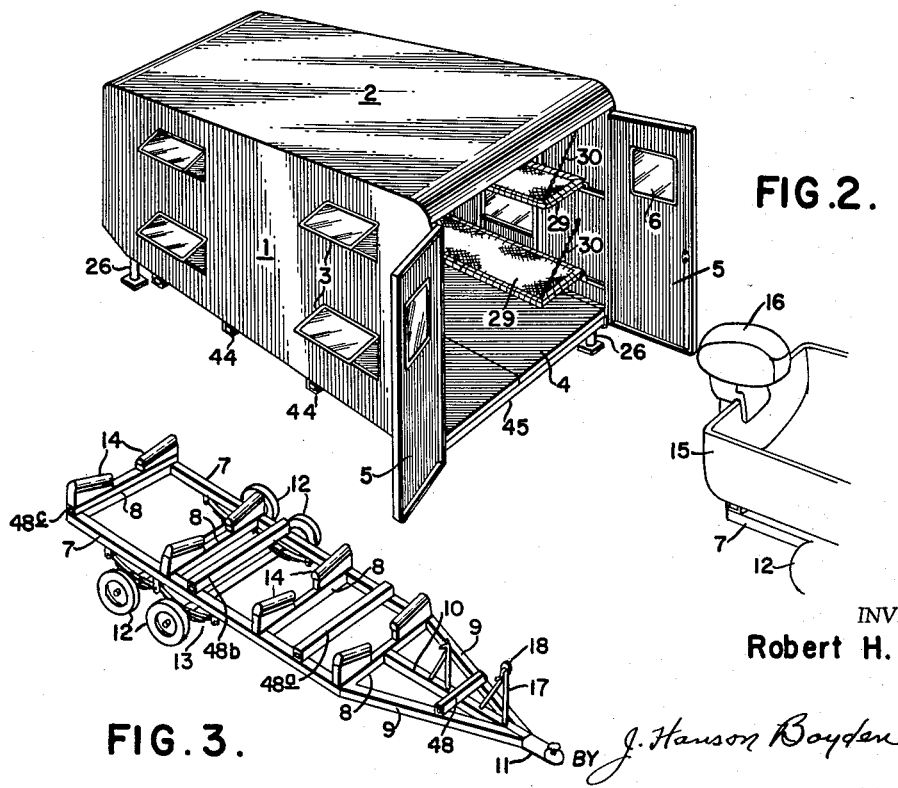
FIG.2.
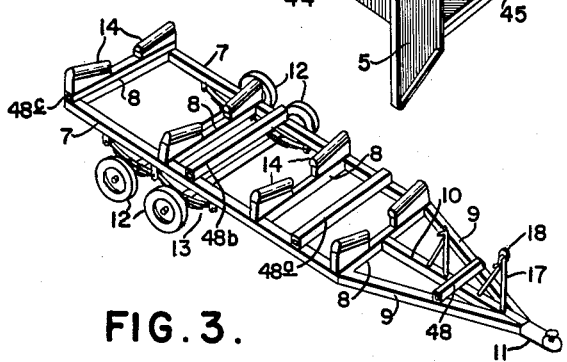
FIG.3.
INVENTOR
Robert H. Muse
BY J. Hanson Boyden,
ATTORNEY

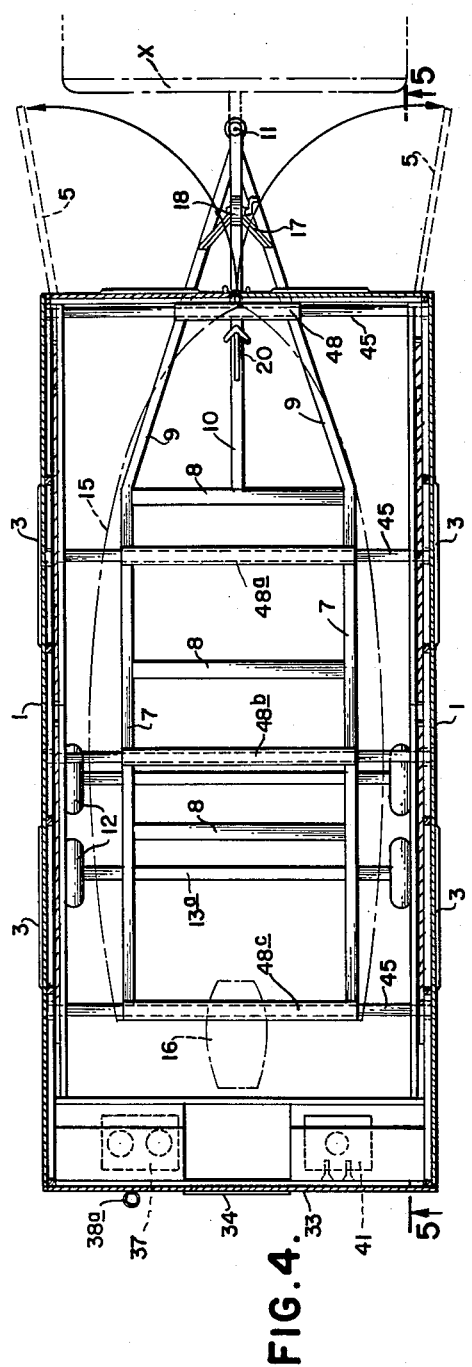

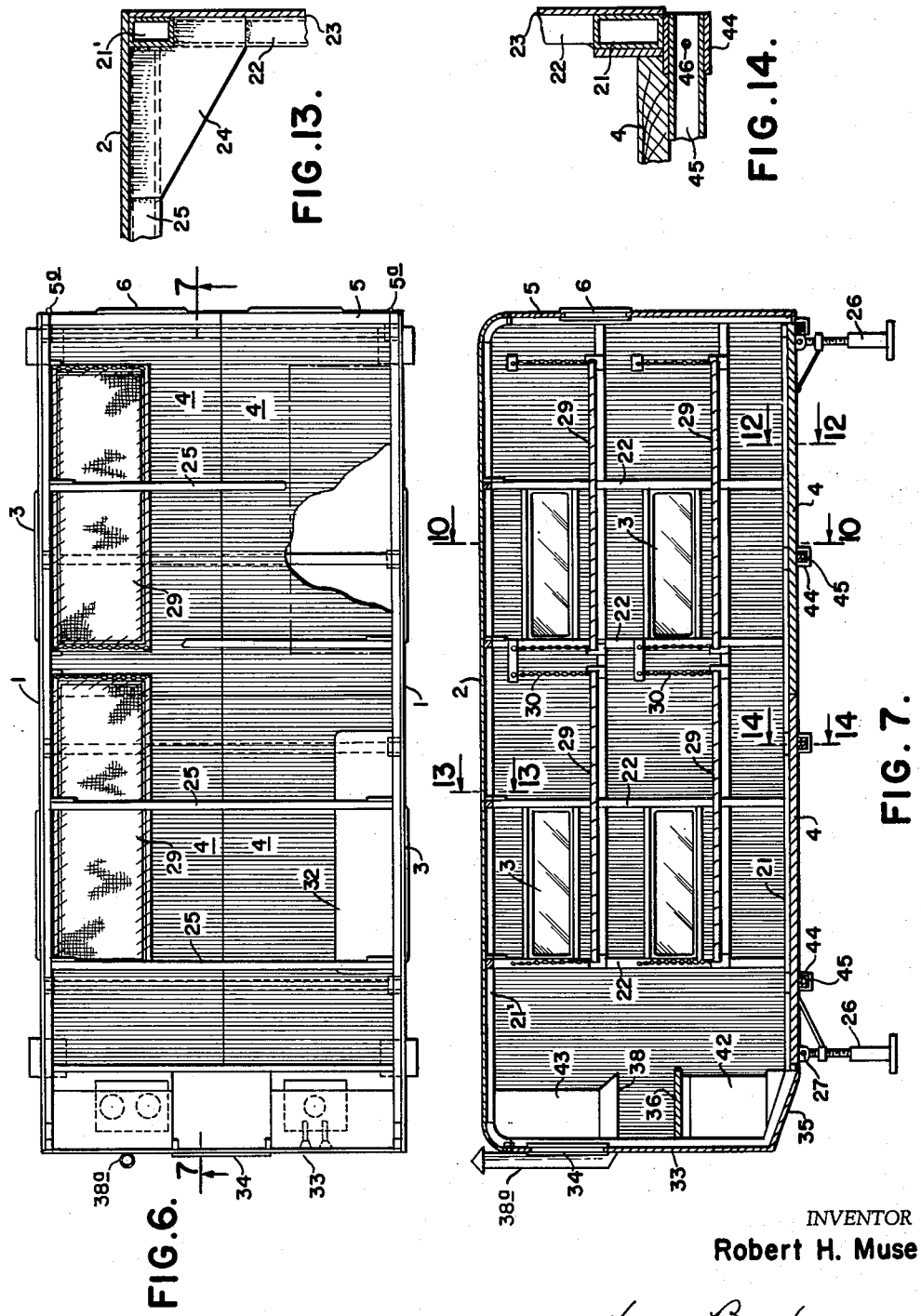

Jan. 7, 1964  R. H. MUSE  3,116,949
BOAT TRAILERS AND SHELTERS
Filed Aug. 4, 1961  4 Sheets-Sheet 4

INVENTOR
Robert H. Muse

BY J. Hanson Boyden,
ATTORNEY

United States Patent Office 3,116,949
Patented Jan. 7, 1964

3,116,949
BOAT TRAILERS AND SHELTERS
Robert H. Muse, 1303 Mormac Road, Richmond, Va.
Filed Aug. 4, 1961, Ser. No. 129,472
7 Claims. (Cl. 296—23)

This invention relates to portable camping equipment, and more particularly to a combined house or shelter and boat trailer, adapted to be attached to any motor vehicle.

An important object of the invention is to provide a rigid type shelter which can be readily transported while transporting a boat.

Another object is to provide a wheeled trailer capable of carrying a rigid type shelter and a boat at the same time, and from which the shelter may be separated as a unit, and supported on the ground, when so separated.

A further and more specific object of the invention is to devise improved, readily detachable means for connecting the shelter to the trailer.

Yet another specific object is to equip the shelter with an improved construction of floor, which floor may be folded back against the side walls, when mounted on the trailer, so as to provide ample room to accommodate the boat within the shelter.

With the above and other objects in view, and to improve generally on the details of such equipment, the invention consists in the construction combination and arrangement of parts hereinafter described and claimed, and illustrated in the accompanying drawings, forming part of this specification, and in which:

FIG. 1 is a perspective view of my improved shelter, trailer and boat, assembled and attached to a motor vehicle, ready for transportation;

FIG. 2 is a similar perspective view of the house or shelter alone, the trailer and boat being removed, and the house being supported on the ground, ready for occupancy as a camp shelter;

FIG. 3 is a perspective view of the boat trailer itself, with the boat removed.

FIG. 4 is a plan view, on a somewhat enlarged scale, of the assembled shelter and trailer, as shown in FIG. 1, the roof of the shelter being omitted, and the position of the boat being indicated in broken lines;

FIG. 5 is a vertical, longitudinal section, substantially on the line 5—5 of FIG. 4, looking in the direction of the arrows;

FIG. 6 is a plan view of the shelter itself when in camping condition, as shown in FIG. 2 the roof being omitted;

FIG. 7 is a vertical longitudinal section substantially on the line 7—7 of FIG. 6, looking in the direction of the arrows;

Figure 8:
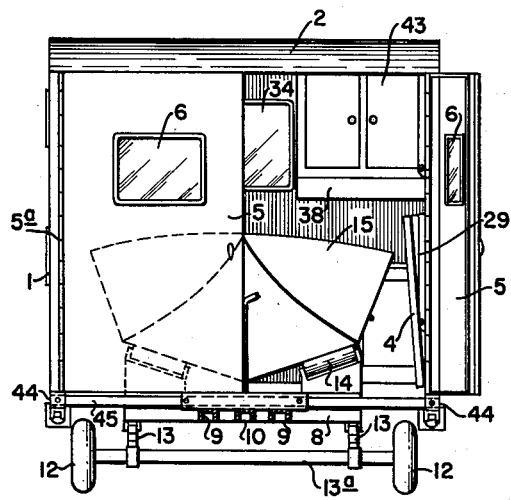
FIG. 8 is a transverse vertical section substantially on the line 8—8 of FIG. 5, looking in the direction of the arrows, one of the doors being shown as open.
Figure 9:
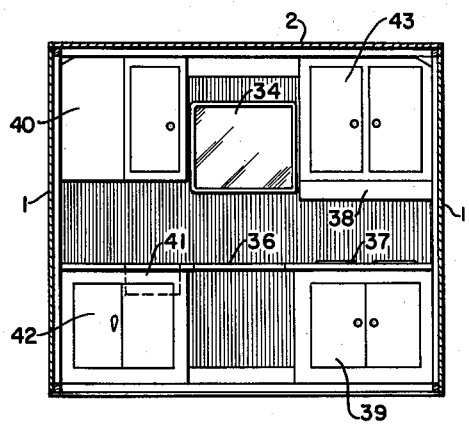
FIG. 9 is a transverse, vertical section substantially on the line 9—9 of FIG. 5, looking in the direction of the arrows.

FIG. 13 is an enlarged, fragmentary, vertical, transverse section substantially on the line 13—13 of FIG. 7, looking in the direction of the arrows and showing method of supporting the roof; and FIG. 14 is an enlarged, fragmentary, vertical transverse section, substantially on the line 14—14 of FIG. 7, looking in the direction of the arrows, and showing method of supporting the floor sections from the side rails of the shelter.

Referring to the drawings in detail, my improved camping equipment comprises a rigid-type house or shelter, having side walls 1 and a roof 2, as shown in FIGS. 1 and 2. This house has a series of windows 3 in its side walls, and a floor formed of a number of sections 4. These sections are hinged to the side walls of the house so that they can fold up, as illustrated in FIG. 1.

The house is provided with a pair of end doors 5, also hinged to the side walls as at 5a. These doors preferably have windows 6 near the top. The other end of the house is closed by a solid end wall 33.

In addition to the house or shelter illustrated in FIGS. 1 and 2, my equipment includes a boat trailer, shown in FIG. 3. This trailer is of a length substantially equal to that of the house and comprises a frame formed of a pair of side members 7 and a plurality of cross members 8. At the front end the side members converge, as shown at 9 and an additional longitudinal member 10 is also preferably incorporated in the structure. At the extreme end is a coupling 11 adapted to be connected to the rear of a motor vehicle as shown in FIGS. 4 and 5.

The trailer frame just described is mounted on wheels 12, suitable springs 13 being interposed between the frame and the axles 13a of the wheels. On the cross members 8 are mounted suitable pillow blocks or rollers 14 to receive and support a boat 15 as best shown in FIG. 8. This boat is illustrated as equipped with an outboard motor 16.

Supported on the trailer frame 9 is a structure 17 adapted to support at its upper end a reel or drum 18 on which is wound a line 19 to assist in handling the boat. Also mounted on the trailer frame is a brace 20 adapted to engage and support the boat.

The house or shelter structure comprises a pair of side rails 21, shown as of hollow rectangular shape, preferably formed of aluminum, and on these side rails are supported vertical struts or studs 22. At the upper end of these struts at each side of the house or shelter is secured another side rail 21′ as shown in FIG. 13, and extending across the house from one of these upper rails to the other are a series of carlines or rafters 25. The joint between the struts 22 and rafters 25 is preferably reinforced by gussets 24 welded to the structural members. Finally the walls of the house or shelter are formed of thin sheet metal, 23, preferably aluminum, secured to the side rails and struts, and a roof 2 of similar material, supported on the rafters 25, forms a weatherproof joint with the upper edges of the side walls 23.

Figure 10:
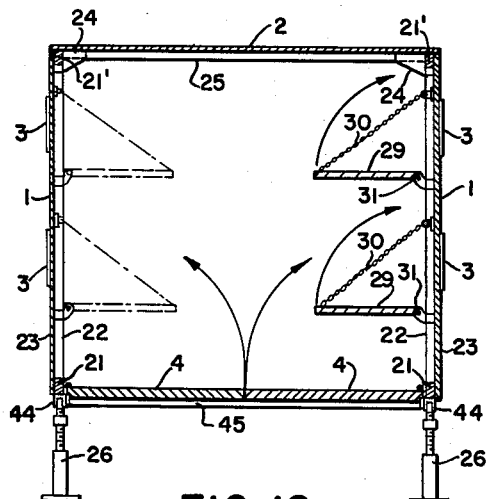
FIG. 10 is a transverse vertical section substantially on the line 10—10 of FIG. 7, looking in the direction of the arrows, some of the bunks being shown in broken lines.

As hereinafter described, the house or shelter, when the equipment is to be transported, is mounted on the trailer, as shown in FIG. 1. Whenever the trailer is removed, as illustrated in FIG. 2, the house or shelter is supported on the ground by means of screw jacks 26 as best shown in FIGS. 7 and 10. When the shelter is being transported these screw jacks are folded up about their pivots 27 as shown in full lines in FIG. 5.

Figure 12:
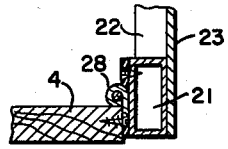
FIG. 12 is an enlarged, fragmentary, vertical, transverse section substantially on the line 12—12 of FIG. 7, looking in the direction of the arrows, and showing method of hinging the floor sections to the side rail of the shelter.

Referring to FIG. 12, the floor sections 4 are secured to the side rails 21 by means of hinges 28, so that they can be folded up against the side walls as shown in FIGS. 1 and 8.

In order to provide sleeping accommodations when the house or shelter is supported on the jacks 26 and used for camping, I provide a plurality of folding bunks 29 hinged to the side walls at 31 and supported as by chains 30, as best shown in FIGS. 2 and 10. When these bunks are folded up, and the floor sections 4 are also folded, it will be seen by reference to FIG. 8 that the bunks and floor sections are disposed in superposed relation against the side walls, the bunks being received between the floor sections and the walls.

While eight of these bunks can be provided, as indicated in FIG. 2, some of them may, if desired, be omitted, as indicated in broken lines in FIG. 10, the space normally occupied by the bunks being used to accommodate tables such as 32 in FIG. 6. It will, of course, be understood that a window 3 is provided adjacent to each bunk so as to afford ample ventilation.

The rear end wall 33 of the house is preferably provided at the middle with a window 34. Between the folding floor sections 4 and the end wall 33 is a short fixed floor 35, and supported on this are a storage cabinet 39 and an ice box 42. The top of the ice box supports a sink 41 and the top of the cabinet supports a camp stove 37. Between the sink 41 and stove 37 is a folding shelf or table 36.

Above the sink is a fresh water tank 40 and above the stove is another cabinet 43 and a hood 38 to carry off the fumes from the stove. This hood 38 connects with a vent pipe 38a as shown in FIGS. 4, 5, 6 and 7.

Figure 11:
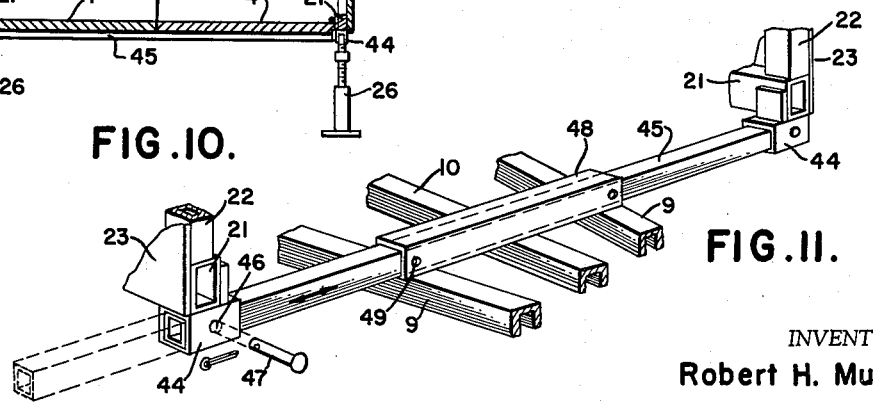
FIG. 11 is a fragmentary perspective view, on an enlarged scale, showing parts of the front end of the trailer and shelter, as illustrated in FIG. 1.

The novel means for detachably connecting the house or shelter to the trailer will now be described. Welded to the under side of each side rail 21 are a series of hollow open-ended transversely directed sockets or brackets 44, as best shown in FIGS. 11 and 14. The sockets at each side of the house or shelter are aligned in pairs so that a tube or bar 45 may be inserted into and through them, and held in place at each end by means of a pin 47 adapted to be inserted through aligned openings 46 in the brackets 44 and in the tube or bar 45. When the house or shelter is arranged for camping purposes as in FIG. 2 with the floor sections 4 folded down in normal position, these floor sections are supported by the tubes or bars 45 as shown in FIGS. 2, 10 and 14. When, however, it is desired to prepare the house or shelter for transportation, the floor sections are folded up as shown in FIGS. 1 and 8, and the bars 45 withdrawn from the sockets 44 as indicated in dotted lines in FIG. 11.

Welded to the trailer frame as shown in FIGS. 3 and 11 are a series of open-ended transversely extending tubes or sockets 48, 48a, 48b and 48c being shown. The forward one of these sockets is shorter than the others, as shown at 48 in FIG. 11, and all of them are provided with openings 49 to receive pins such as 47 which pass through registering openings in the tube or bar 45. These tubes or bars are shown as of square section and are preferably formed of aluminum.

Assuming that the house or shelter is in camping condition and is resting on the ground, as shown in FIGS. 2, 7 and 10, and it is desired to prepare it for transportation on the trailer, the floor sections 4 and bunks 29 are folded up, the bars 45 removed and the trailer, with the boat on it if desired, is carefully backed into the house or shelter through the open doors 5. By carefully manipulating the jacks 26 and by adjusting the trailer slightly back and forth, the tubes or sockets 48, 48a, 48b and 48c on the trailer can be brought into alignment with the corresponding brackets or sockets 44 carried by the house or shelter. When such alignment has been effected, one of the bars 45 is inserted through each pair of aligned sockets 44 and the corresponding tube on the trailer such as 48 and secured in position as by means of pins 47. The doors 5 may then be closed, the jacks 26 folded up, and the equipment is ready for transportation.

When transporting the equipment from the owner's residence to the beach, the reverse procedure is followed; upon arriving at the desired spot, the jacks 26 are lowered and adjusted so as to take the strain off of the bars 45. These bars can then be unpinned and removed, and the boat and trailer can be withdrawn from the house or shelter. After the trailer has been withdrawn, the bars 45 are replaced in the aligned sockets 44, and the floor sections 4 may then be turned down and supported on these bars.

It will thus be seen that I have provided a house or shelter which protects the boat during transportation and in which the boat may be stored at the beach, if desired, during the owner's absence, and that when then trailer and boat are removed, the shelter serves as a well furnished camp, provided with sleeping accommodations and kitchen equipment, for comfortable living.

What I claim is:

1. Portable camping equipment comprising, in combination, a wheeled trailer having an elongated frame adapted to be attached at one end to a motor vehicle, an independently fabricated rigid type shelter constructed to be supported on said trailer and including a floor, side walls and a roof, said side walls being spaced a fixed distance apart at all times and permanently secured to said roof and means for detachably connecting said shelter to the frame of said trailer, whereby said shelter may be separated as a unit from said trailer, said detachable connecting means comprising groups of aligned, hollow, open ended brackets, each group comprising three brackets, the two end brackets being carried by said shelter unit and the middle one being secured to the trailer frame, and a renewable bar extending transversely through each group of said aligned, hollowed brackets.

2. Portable boat carrying and camping equipment comprising, in combination, a boat trailer, a separately fabricated rigid type shelter of a length approximating that of said trailer and constructed to be supported at its side edges on said trailer, said shelter having fixed side walls and a roof, and having a floor formed of sections hinged at their outer edges to the side walls but free at their inner edges, so that they may be folded back and against said walls to provide space between them to accommodate a boat carried by said trailer, means for detachably connecting said shelter and trailer, and for supporting said shelter from the ground, whereby said trailer may be removed from said shelter, and means for supporting said floor sections in normal position when said trailer is removed.

3. Equipment in accordance with claim 2 in which the means for supporting the floor sections comprises bars extending transversely between and detachably secured to the side walls of the shelter, said bars being readily removable when the floor sections are folded up, to permit the trailer to enter the shelter.

4. Equipment in accordance with claim 2 in which groups of hollow, open ended, transversely extending brackets are carried by the sides of said shelter and by said trailer respectively, and a bar constructed to be inserted through each group of said brackets when aligned, to detachably connect said shelter and trailer, said bars adapted, when said trailer is removed, to extend between the brackets on opposite sides of said shelter to support said floor sections in normal position.

5. Portable, convertible boat-carrying and camping equipment comprising, in combination, a wheeled trailer constructed to carry a boat, and having a frame at least as long as the boat to be carried, an independently fabricated rigid type shelter of a size sufficient to house said boat and constructed to be supported at its side edges on said trailer frame, for transportation purposes, means for also supporting said shelter on the ground independently of said trailer, said shelter having fixed side walls and a roof, and also having a floor formed of sections hinged at their outer edges to said fixed side walls so that they may be folded back against said fixed walls but unconnected at their inner edges, one end of said shelter consisting of a pair of folding doors hinged to said sidewalls, so that, when said floor sections are folded up and said doors open, and said shelter supported on the ground, said trailer and any boat carried thereby, may be moved endwise into and out of said shelter, and readily detachable means whereby said trailer may be connected with or separated from said shelter as a unit.

6. Portable camping equipment comprising, in combination, a wheeled trailer adapted to be attached to a motor vehicle, an independently fabricated shelter having a rigid floor frame, side walls and a roof, a floor formed of folding sections hinged to said frame and arranged to be folded back against said side walls when not in use, said shelter constructed to be supported on said trailer and detachable therefrom as a unit, means for supporting said shelter unit on the ground when detached, and means including a plurality of removable bars extending transversely from one side to the other of said shelter unit for either connecting said shelter unit to said trailer, when the floor sections are folded up, or supporting said floor sections in normal position when said trailer is detached.

7. Portable convertible camping equipment comprising, in combination, a wheeled trailer constructed to support a boat, and adapted to be attached to a motor vehicle, an independently fabricated shelter having a rigid floor frame, fixed side walls and a roof, folding bunks hingedly mounted on said side walls, a floor formed of folding sections hinged at their outer edges to said frame, but unconnected at their inner edges both said bunks and said floor sections being foldable back against said side walls in superposed relation, to provide a space to accommodate a boat and means for supporting said shelter as a unit either on said trailer, with floor sections and bunks folded up, or on the ground with floor sections and bunks in usable position.

References Cited in the file of this patent

UNITED STATES PATENTS

| | | |
|---|---|---|
| 2,797,008 | Banker | June 25, 1957 |
| 2,834,599 | Sarchet | May 13, 1958 |
| 2,847,136 | Neff | Aug. 12, 1958 |
| 2,934,373 | Doty | Apr. 26, 1960 |
| 2,977,010 | Okey | Mar. 28, 1961 |

FOREIGN PATENTS

| | | |
|---|---|---|
| 424,974 | Great Britain | Mar. 1, 1935 |
| 1,152,689 | France | Sept. 9, 1957 |